(12) United States Patent
Lu et al.

(10) Patent No.: US 6,778,984 B1
(45) Date of Patent: Aug. 17, 2004

(54) FLEXIBLE AND HIGH-PERFORMANCE PACKET CLASSIFICATION ALGORITHM

(75) Inventors: Kuo-Cheng Lu, Hsinchu (TW); Shi-Ming Zhao, Taipei (TW); Kuo-Hua Yuan, Kanhsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 656 days.

(21) Appl. No.: 09/695,396

(22) Filed: Oct. 23, 2000

(30) Foreign Application Priority Data

Mar. 22, 2000 (TW) ........................................ 89105205 A

(51) Int. Cl.[7] .............................................. G06F 17/30
(52) U.S. Cl. .................... 707/4; 707/5; 707/3; 707/101
(58) Field of Search ........................... 707/1–4, 5, 101; 370/392, 3, 389

(56) References Cited

U.S. PATENT DOCUMENTS 6,298,340 B1 * 10/2001 Calvignac et al. ............. 707/3
6,449,256 B1 * 9/2002 Varghese et al. ............ 370/238
6,463,067 B1 * 10/2002 Hebb et al. ................. 370/413
6,600,744 B1 * 7/2003 Carr et al. .................. 370/392

* cited by examiner

Primary Examiner—Greta Robinson
Assistant Examiner—Debbie M. Le
(74) Attorney, Agent, or Firm—J.C. Patents

(57) ABSTRACT

A flexible and high-performance packet classification algorithm. The algorithm includes converting the original rule database into rule mapping table format for storage. The method of producing the rule mapping table includes partitioning an input key into a plurality of sub-keys, and sequentially comparing various grouping combinations of each sub-key with the same sub-key field of each rule. Finally, the results are stored in the rule mapping table using a bit-map method. This invention provides a packet classification algorithm that support a plurality of rule databases or sub-tables such that the co-existence of a plurality of rule databases each having a different length and width in the same search engine is permitted. In addition, the design can provide actual improvements (higher speed, smaller volume occupation) and flexibility (possible coexistent of different rule databases). Moreover, the search method can be used as a general-purpose search engine in the design of network processor or in any situation when rapid search is necessary. The search method can serve even as a replacement technology for CAM.

7 Claims, 6 Drawing Sheets

FLEXIBLE AND HIGH-PERFORMANCE PACKET CLASSIFICATION ALGORITHM

CROSS-REFERENCE TO RELATED APPLICATION

This application claims the priority benefit of Taiwan application serial no. 89105205, filed Mar. 22, 2000.

BACKGROUND OF THE INVENTION

1. Field of Invention

The present invention relates to a method for searching a database with don't care fields. More particularly, the present invention relates to a flexible and high-performance packet classification algorithm capable of partitioning packets into sub-tables each having a different data field width and depth. The algorithm is particularly useful for internet router path table lookup and packet classification or serving as a general search engine for a network processor.

2. Description of Related Art

To provide a more flexible service, a router no longer simply performs a search in a routing table followed by redirecting an incoming packet to the next workstation. A current internet switch/router needs to have packet classification capability, the capacity to provide different service quality insurance (QoS) or the capacity to provide processing of data at different safety levels within a virtual private network. In addition, the 'firewall' that ensures network safety also relies on packet classification techniques for granting permission for entering or leaving a network. In other words, many new types of network services depend very much on packet classification.

To achieve high-quality packet classification, the capacity to resolve a packet header is very important. Using the TCP/IP standard as an example, if we decide to use application flow, the 104-bit header that includes an IP Source address (32 bits), an IP destination address (32 bits), a protocol (8 bits), a source port number (16 bits) and destination port number (16 bits) must refer to the rule database in order to determine how to process a packet. In general, the content included in most rule database would permit the network administrator to set up flexible rules for the so-called don't care fields.

For example, Table No. 1 lists some typical rules ('X' refers to a don't care field).

Due to the increasing importance of packet classification, a number of articles related to search algorithms have been published in international journals. For example, V. Srinivasan et al. (V. Srinivasan, G. Varghese, S. Suri, and M. Waldvogel, "Fast and Scalable Layer 4 Switching." ACM SIGCOMM' 98, Vancouver, British Columbia) have proposed a cross-product search method. T. V. Lakshman et al. (T. V. Lakshman and D. Stiliadis, "High-Speed Policy-Based Packet Forwarding Using Efficient Multi-dimension Range Matching." ACM SIGCOMM' 98, Vancouver, British Columbia) have proposed using five memory banks to search 1024 rules. N. Mckeown et al. (N. Mckeown, "Packet Classification on Multiple Fields.' Inforcomm 2000) has proposed a compress algorithmic method via rule property observation. However, all these conventional methods are low in performance or use vast quantities of storage in the worst case scenarios. Moreover, the conventional methods are unsuitable for other types of search (such as IP path table). Content addressable memory (CAM) (T. Pei and C. Zukowaki, "Put Routing Table in Silicon." IEEE Network Magazine, pp. 42–50, January 1992) is also one of the techniques for resolving packet classification problems. Yet, the biggest drawback of using CAM is that the memory is quite expensive at present. Furthermore, special circuit design and layout technique must be used if CAM is used. Hence, CAM has still not been widely adopted.

SUMMARY OF THE INVENTION

Accordingly, one object of the present invention is to provide a flexible and high-performance packet classification algorithm that involves the conversion of original rule database into a rule mapping table format for storage. The rule mapping table is formed by dividing an input key into a plurality of sub-keys, and then sequentially comparing the ordering of each sub-key with the same sub-key field of each rule. Finally, the results of the comparison ('1' indicates a match while a '0' indicates a mismatch) are stored in the rule mapping table through bit mapping.

According to this invention, if the input key has a width of W bits, each sub-key has G bits and the rule database has N rules, the rule mapping table has a size (S) given by the formula $S=(W/G) \times N \times 2^G$ (bits) and the minimum amount of memory read out in each search (A) is given by the formula $A=(W/G) \times N$ (bits).

In addition, when grouping state of each sub-key is two, that is, having a width of two ($G=2$), the smallest rule mapping table can be obtained. Size of the smallest rule mapping table is given by the formula $S=(W \times N) \times 2$ (bits) with a corresponding smallest amount of memory read out given by the formula $A=(W \times N)/2$ (bits).

The method of searching the rule mapping table includes extracting every sub-key from the input key, reading out corresponding rule vectors in the rule mapping table using the sub-key values directly as indexes, and carrying out a AND-computation of the rule vectors. The resultant vector after computation is known as a conformed rule vector. If the conformed rule mapping is non-zero, the leftmost bit (assuming that the leftmost rule has the highest priority) representation is taken out to represent the search result. The search result is made to multiply with the size of associated data. Together with the starting address for holding associ-

TABLE NO. 1

A typical packet classification table

| Source IP | Destination IP | Protocol | Source Port | Destination Port | Service Quality |
|---|---|---|---|---|---|
| 140.96.115.X | X.X.X.X | 06(TCP) | 80(HTTP) | X | High |
| 140.96.114.X | 140.96.116.X | X | X | X | Medium |
| X.X.X.X | X.X.X.X | X | X | X | Low | ated data, a data storage address corresponding to the search result can be found.

This invention uses a plurality of search engines all working in parallel to process rule mapping table search operations. Each search engine processes a portion of the rule vector. Meanwhile, the assignments of sub-key fields to each search engine are achieved through an interleave matrix.

Furthermore, the rule mapping table can be dissected into a plurality of sub-tables such that the number of rules and rule width in each sub-table can be set. Each sub-table has an initial scan value register, a terminal scan value register and a register for recording the width of the sub-table. Each sub-table can even have a register for registering the initial address of memory for holding associated data and a register for registering size of storage location for the associated data.

This invention also provides a flexible and high-performance packet classification algorithm that support a plurality of rule databases or sub-tables. In addition, this invention permits the co-existence of a plurality of rule databases each having a different length and width in the same search engine. Therefore, the design can provide actual improvements (higher speed, smaller volume occupation) and flexibility (possible coexistent of different rule databases). Moreover, the invention not only can provide a dynamic setting of different rule width for sub-tables on physical memory units, but can also provide unlimited flexibility to the search algorithm. In brief, the search method of this invention can be used as a general-purpose search engine in the design of network processor or in any situation where rapid search is necessary. The search method can serve even as a replacement technology for CAM.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
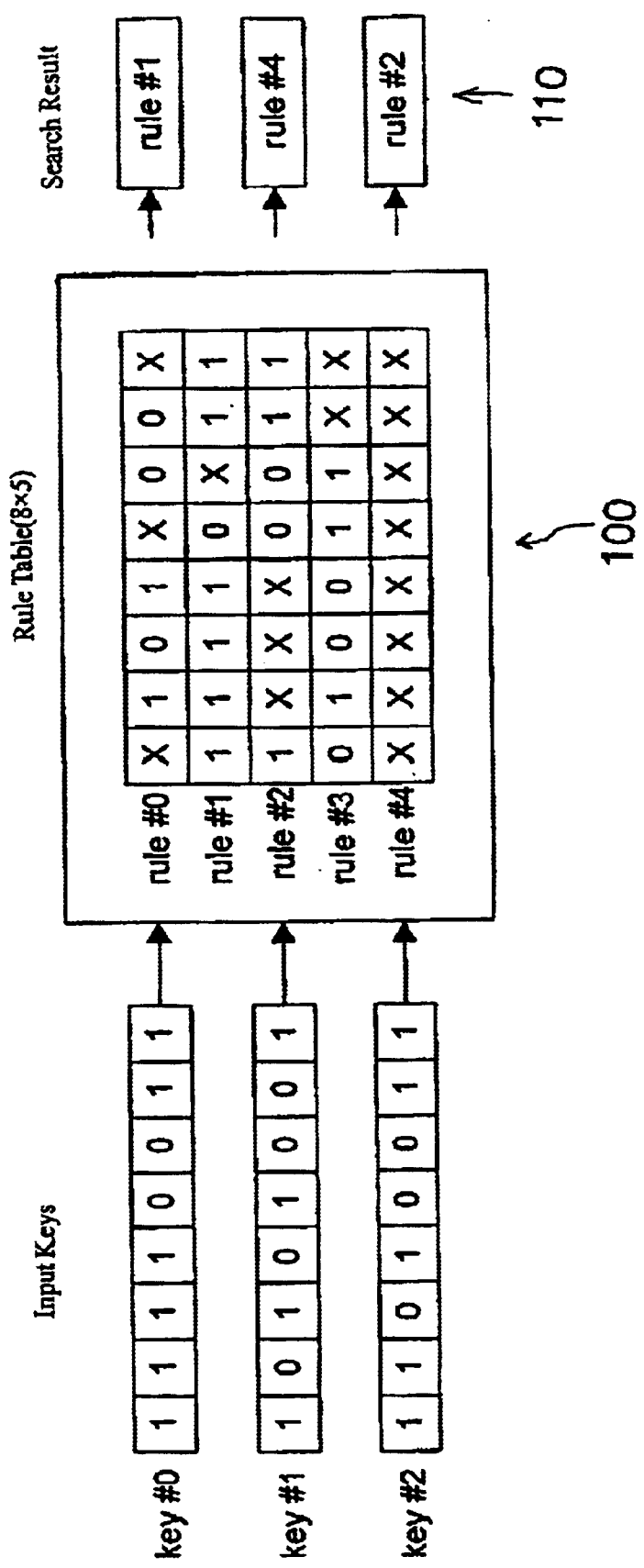
FIG. 1 is a diagram showing a packet classification database having five 8-bit rules.

Reference sill now be made in detail to the present preferred embodiments of the invention, examples of which are illustrated in the accompanying drawings. Wherever possible, the same reference numbers are used in the drawings and the description to refer to the same or like parts.

The goal of this invention is to provide a high-speed and economical search method particularly for searching data that includes don't care bit fields. To simplify explanation, a rule table having just five rules is selected in the following illustration. FIG. 1 is a diagram showing a packet classification database having five 8-bit rules. As shown in FIG. 1, the rule table 100 has five 8-bit rules with each rule bit having '1', '0' or 'x' (don't care). The search method of this invention is capable of finding a rule that conforms to a particular input key in rule table 100. When more than one rule conforms to the input key, the search method takes up the earlier one in the rule table list as the lookup result of the search. Using an input key #0('111110011') as an example, conformed rules in table 100 includes rule #1('11110×11'), rule #2('1×××0011' and rule #4('××××××××'). Under such circumstances, the search method chooses rule #1 as a search result 100.

Figure 2:
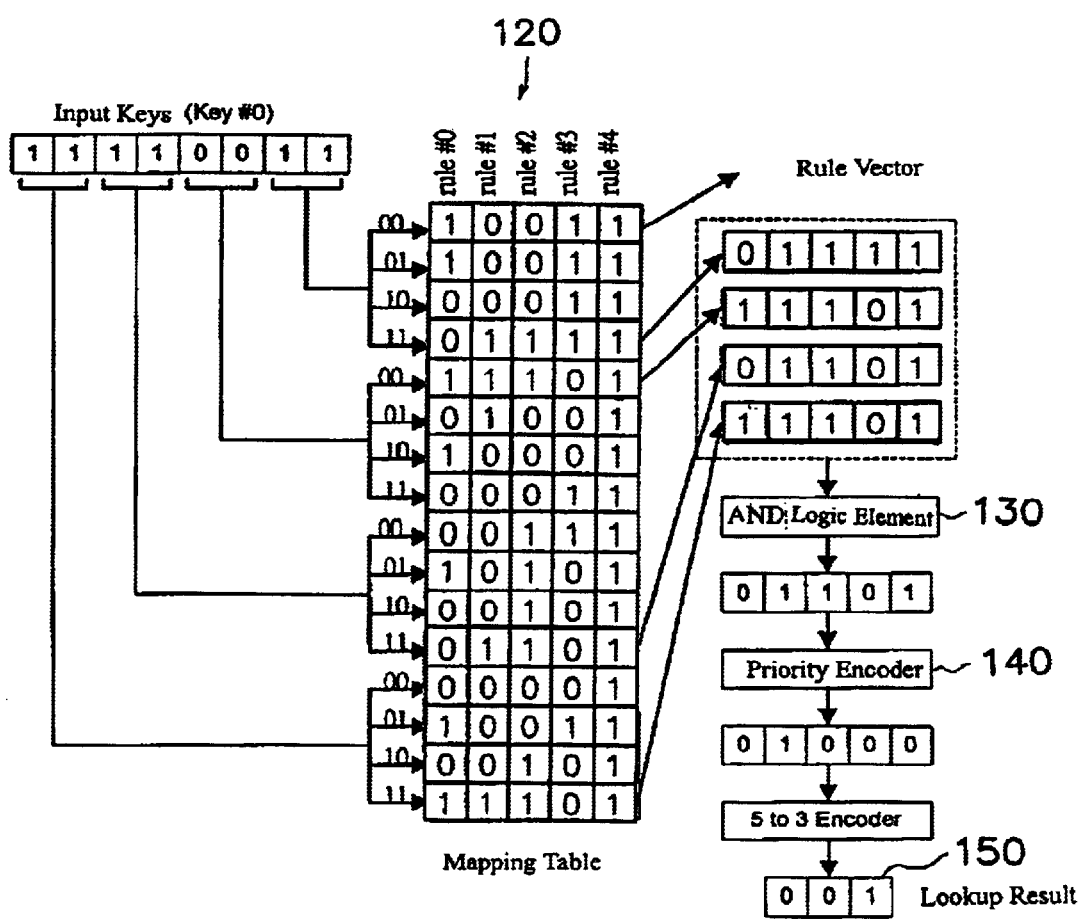
FIG. 2 is a diagram showing the packet classification algorithm according to this invention.

The following is a description of the packet classification algorithm provided by this invention. First, the original rule table must be converted into a rule mapping table and stored in a memory unit. FIG. 2 is a diagram showing the packet classification algorithm according to this invention. The mapping table 120 shown in FIG. 2 is generated by dividing the input key into a plurality of sub-keys. Thereafter, various combinations of the bits inside each sub-key value and same sub-key value field to of each rule are compared. The result of the comparison is stored in mapping table 120 according to a bit map method ('1' represents a match while '0' represent a mismatch). Later, in the following description, rule vector (I, J) is used to refer to the converted bit mapping of mapping table 120 when the value of the $I^{th}$ sub-key with sub-key value equal to J.

Using rule table 100 in FIG. 1 as an example, if the 8-bit input key is divided up into four 2-bit sub-keys, rule mapping table 120 shown in FIG. 2 is obtained. For sub-key #0 {bit #1, bit #0} of the input key, rule vector (0,0) that corresponds to the sub-key #0 with sub-key value equals to 0, is {1, 0, 0, 1}. This indicates that when bit #1 and bit #0 of the input key is {0,0}, rule #0, rule #3 and rule #4 conform. Similarly, rule vector (0,3) that corresponds to the sub-key #0 with sub-key value of 3 is {0, 1, 1, 1, 1}. This indicates that when bit #1 and bit #0 of the input key is {1,1}, rule #1, rule #2 #3 and rule #4 conform.

After the establishment of rule mapping table 120, searching operations are very much simplified. All that is required is to extraction of all the rule vectors corresponding to the search key value. Using the input key #1('11110011') in FIG. 2 as an example, four rule vectors including rule vector (0, 3), rule vector (1, 0), rule vector (2, 3) and rule vector (3, 3) (shown in shade) are required. A logic AND operation of the rule bit mappings are carried out to obtain a conformed rule vector: {0, 1, 1, 0, 1 }. This indicates that the input key conforms to rule #1, rule #2 and rule #4. Finally, a AND logic element 130 and a priority encoder 140 are used to extract the leftmost rule, that is, rule #1. Hence, rule #1 becomes the lookup result 150.

To make a clear analysis of the performance of the search method, parameters includes granularity (G) for indicating the number of bits in each sub-key field, width (W) for indicating the width of each rule in the rule table (or input key width) and a number (N) for indicating the number of rules in the rule table that are used. (In the said example above, G=2, W=8, N 5). Memory size (S) required to house the rule mapping table is given by the formula:

$$S=(W/G) \times N \times 2^G \text{ (bits)} \qquad (1); \text{ and,}$$

amount of reading (A) from memory in each search is given by the formula:

$$A=(W/G) \times N \text{ (bits)} \qquad (2).$$

According to the values supplied by the said example (G=2, W=8, N=5), size of memory required to store the rule mapping table 120 is $(8/2) \times 5 \times 2^2 = 80$ bits. The volume read out from memory for each search operation is $(8/2) \times 5 = 20$, in total agreement with what is shown in FIG. 2. A special phenomenon can also be observed from formulae (1) and (2). When G=1 or 2, the smallest memory is required to accommodate the rule mapping table:

$$S=(W/1) \times N \times 2^1 = (W/2) \times N \times 2^2 = W \times N \times 2 \text{ (bits)} \qquad (3).$$

However, with a G=2 grouping state, the amount of reading from memory for each search is only half that with a grouping state G=1. Hence, a grouping state of G=2 produces not only the minimal memory space for a given rule mapping table but also demands fewer memory reading operations.

Figure 3:
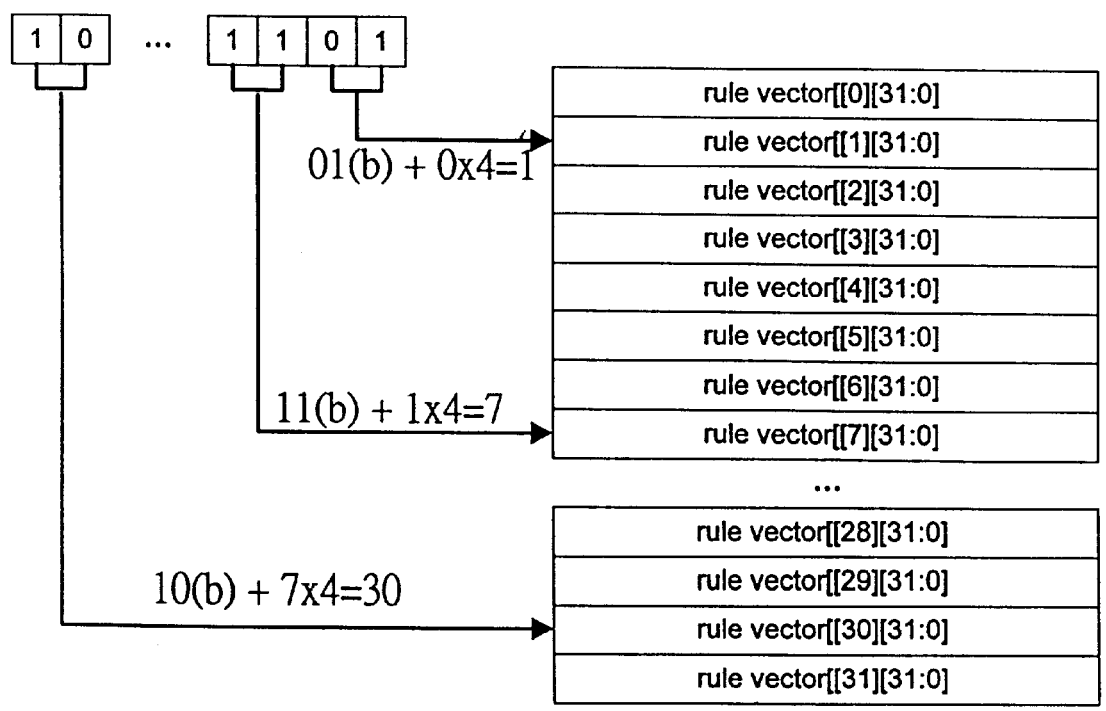
FIG. 3 is a diagram showing a rule table having a 16-bit width and a 32-entry depth.

In the following description, a 16-bit wide, 32-entry deep rule table is chosen as an example. A grouping state G=2 is used to generate a rule mapping table. As said before, G=2 grouping produces the smallest size for holding the rule mapping table. As noted earlier, this type of rule mapping table has altogether 32 rule vectors (16-bit input key is equivalent to 8 sub-key and each sub-key field maps to four rule vectors each having 32 bits). FIG. 3 is a diagram showing a rule table having a 32-bit width and a 32-entry depth. In FIG. 3, rule vector [1][31:0] represents a bit map that conforms to the rule when the sub-key field #0 of the input key is 2'b01. Similarly, rule vector [7][31:0] represents a bit map that conforms to the rule when the sub-key filed #1 of the input key is 2'b11.

To search through the rule mapping table, the eight rule vectors must be read out sequentially and the overlapping portion must be extracted at the same time. To accelerate the search speed, four search engines, all operating in parallel, are used. Each search engine is responsible for two sub-key fields. In other words, two rule vectors (altogether 64 bits) amongst the eight rule vectors are read out to perform AND computation. Since a bit further to the left has a higher priority, the left-hand portion of the rule vector is processed with first priority (the AND cycle #0 is subsequent description). If no known rule number conforms after the search, the right-hand portion of the rule vector is also sequentially searched (the AND cycle #1 in subsequent description).

In general, physical aspects regarding the actual method of fabrication such as memory width and priority encoding speed must also be considered. For a search engine having a 16-bit memory width, altogether four read cycles are required to read out two rule vectors. Since the four search engines operate in parallel, overall search time between using four search engines and one search engine is the same four read cycles.

Figure 4:
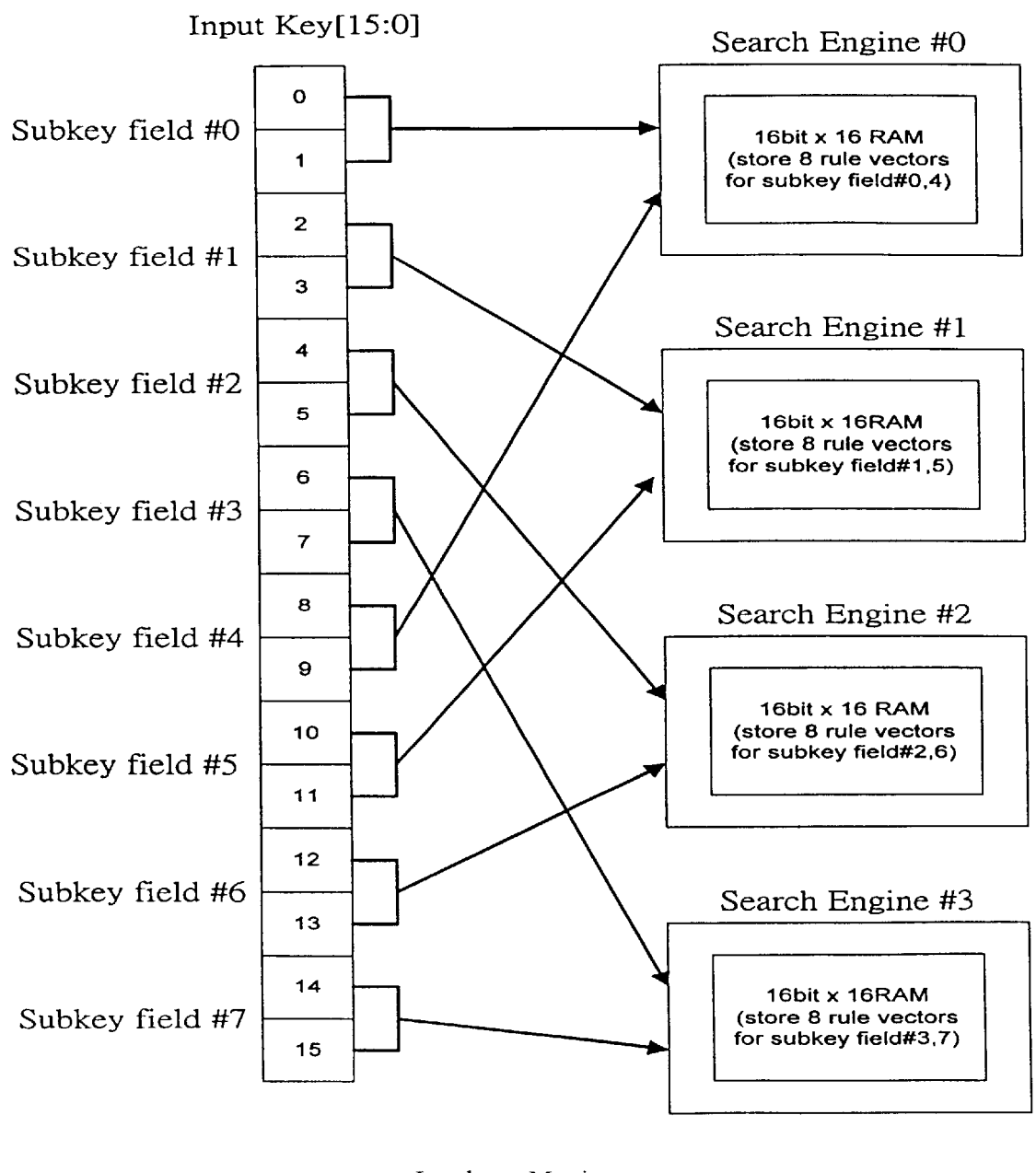
FIG. 4 is a diagram showing the search engines in a parallel-processing system.

FIG. 4 is a diagram showing the search engines in a parallel-processing system. Note that search engine #0 is responsible for the rule vectors related to sub-key field #0 and sub-key field #4 rather than sub-key field #0 and sub-key field #1. This type of to rule vector scheduling is often called an interleave matrix assignment. The advantage of interleave matrix assignment is that an equal number of sub-key fields can still be assigned to each search engine for parallel processing even if a narrower rule (for example, 8 bits) needs to be supported.

Figure 5:
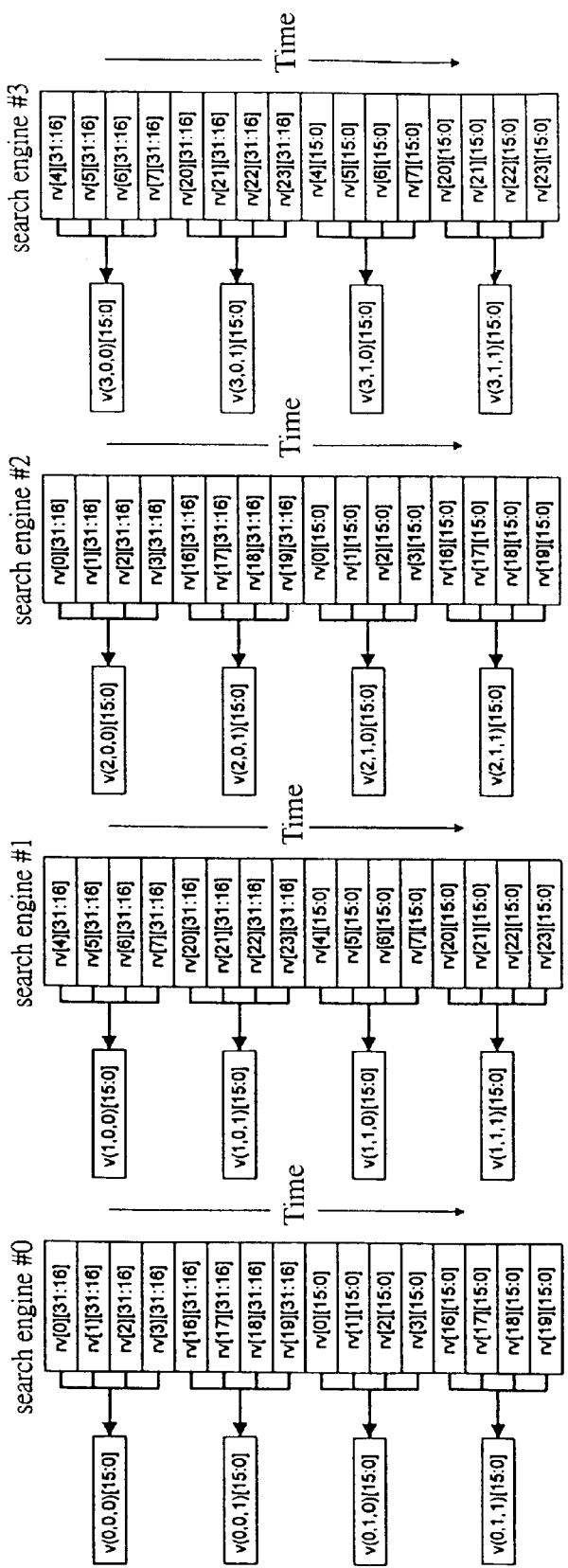
FIG. 5 is a diagram showing the contents within the four search engines shown in FIG. 4.

FIG. 5 is a diagram showing the contents within the four search engines shown in FIG. 4. In this example, the first two ready cycles (known as AND cycle #0) of each search engine are responsible for the AND computation of the first 16-bit of each rule vector. In FIG. 5, V(I, J, K)[15:0] represents the read-out vector of each read cycle, where I represents a particular search engine, J represents a particular AND cycle and K represents a particular read cycle.

Figure 6:
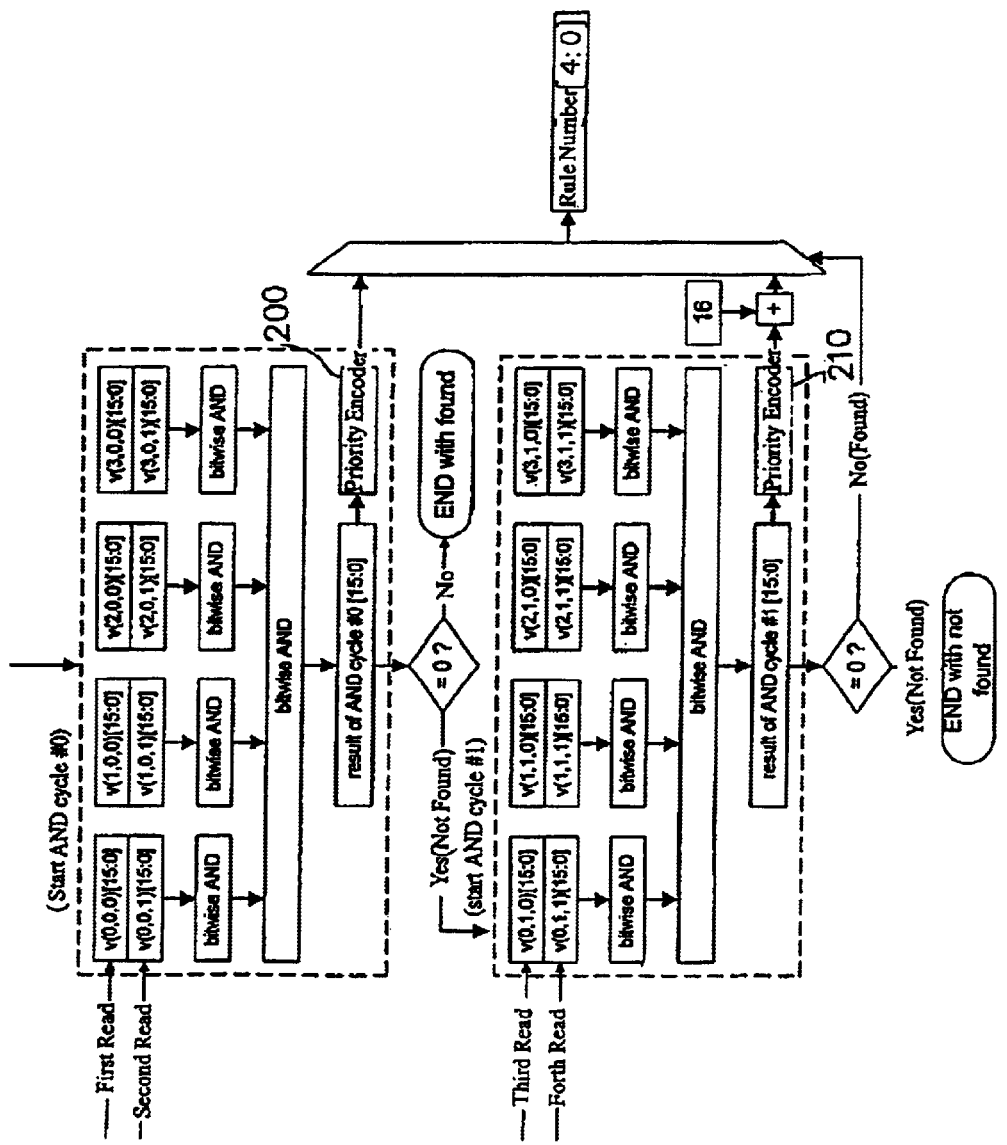
FIG. 6 is a flow chart showing the entire table-search algorithm according to this invention.

FIG. 6 is a flow chart showing the entire table-search algorithm according to this invention. Starting with the first AND Cycle #0, the eight vectors read out by the four search engines are logically AND together. After passing through a priority encoder 200, whether the input key conforms to any of the rules 0–15 can be determined. If no such rules are found after the AND cycle #0, a subsequent AND cycle #2 is carried out. After the extraction of each rule vector, a 16-bit AND computation is carried out. If a suitable rule is found, the priority encoder 210 outputs a rule number (0 . . . 15). After adding 16 (since phase#2 handles the remaining 16 rules) to the rule number, a conformed rule number is obtained.

Through the said technique, rule mapping table lookup can be achieved with each search engine processing a portion of the sub-key fields in parallel. By using interleave matrix, the search algorithm is even capable of processing rules that have a varying width. Furthermore, this invention can support a plurality of rule databases or sub-tables. The only criteria are to set up the initial scan value, the terminal scan value and rule width of the desired search sub-table. After the setting of the initial scan value, the search engines can search for the sub-table automatically. Consequently, a plurality of rule databases each having a different length and width can coexist inside the same search engine so that operating characteristics (such as speed and volume occupation) and flexibility (the coexistence of different rule databases) are improved.

In addition, each sub-table has an initial address register for holding associated data and a register for holding size of associated data. By multiplying the search out rule number with size of the associated data and adding the initial address of associated data in memory, the address for holding rule data is found.

In summary, this invention provides a flexible and efficient packet classification algorithm that not only can dynamically assign a plurality of sub-tables each having a different rule width in a physical memory unit, but also can increase flexibility of the search algorithm. For example, a 128-bit wide sub-table can be partitioned out to specialize in flow classification work; a 32-bit wide sub-table can be partitioned out to specialize the inquiry of IP route path; and a 64-bit wide sub-table can be partitioned out to accommodate a MAC address. Moreover, the flexible and high-performance search method can be applied to the design of network processor that can be used as a general-purpose search engine.

The invention can be used in any circumstances that require rapid searching. In addition, the invention can be used as a replacement technique for CAM. For example, the invention can be adapted to LAN switch router, four-layered switch, virtual private network, network traffic measurement, network processor, flow classification, firewall products and so on.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A packet classification method, comprising:

converting an original rule database into a rule mapping table format for storage, wherein the method of producing the rule mapping table includes:

dividing an input key value into a plurality of sub-key values;

sequentially comparing various combination of each sub-key value with the same sub-key field of each rule; and storing the result of comparison in the rule mapping table by a bit-map method, wherein a size (S) of the rule mapping table is given by a formula:

$$S=(W/G) \times N \times 2^G \text{(bits); and,}$$

the amount of memory read (A) for each search is given by a formula:

$$A=(W/G) \times N \text{(bits), where}$$

W is the width of the input key in bits, G is the number of bits in each sub-key and N is the number of rules in the rule database, wherein a smallest size of the rule mapping table is given by a formula:

$$S=(W \times N) \times 2 \text{(bits), and}$$

a minimum amount of memory reading (A) in each search corresponding to the smallest size of the rule mapping table is given by a formula:

$$A=(W \times N)/2 \text{(bits),}$$

when each sub-key has a grouping state with a width of two (G=2).

2. The method of claim 1, wherein the step of searching the rule mapping table includes:

extracting sub-keys from the input key to serve as a direct index for picking up corresponding rule vectors from the rule mapping table; and performing a AND-computation of the rule vectors to form conformed rule vectors and extracting the leftmost bit to represent the lookup result if the conformed rule mapping is non-zero.

3. The method of claim 2, wherein the search of the rule mapping table is carried out using a plurality of search engines working in parallel with each search engine processing a portion of the rule vector and the assignment of sub-key fields to the search engines is achieved through an interleave matrix method.

4. The method of claim 2, wherein the lookup result is multiplied by size of associated data, and added with the starting address of memory for holding the associated data, an address for holding data corresponding to the lookup result is found.

5. The method of claim 1, wherein the rule mapping table can be partitioned into a plurality of sub-tables with each table having a definite rule width and a definite number of rules.

6. The method of claim 5, wherein each sub-table includes a register for recording an initial scan value, a register for recording a terminal scan value and a register for recording width of the sub-table.

7. The method of claim 5, wherein each sub-table includes a register for holding information regarding the storage of associated data memory initial address and a register for holding information regarding the storage of associated data size.

* * * * *